United States Patent [19]

Magnusson

[11] Patent Number: 4,823,222
[45] Date of Patent: Apr. 18, 1989

[54] WEBBED SCANNER WINDOW

[75] Inventor: Steven L. Magnusson, Redwood City, Calif.

[73] Assignee: Ampex Corporation, Redwood City, Calif.

[21] Appl. No.: 114,936

[22] Filed: Oct. 29, 1987

[51] Int. Cl.4 .................. G11B 21/06; G11B 15/61
[52] U.S. Cl. .................................................. 360/130.24
[58] Field of Search .................................. 360/130.24

[56] References Cited

U.S. PATENT DOCUMENTS

| 3,151,796 | 10/1964 | Lipschutz | 226/97 |
| 3,197,575 | 7/1965 | Eckstein | 179/100.2 |
| 3,247,329 | 4/1966 | Tomita et al. | 179/100.2 |
| 3,479,648 | 11/1969 | Sleven et al. | 340/172.5 |
| 3,487,374 | 12/1969 | Droux | 340/172.5 |
| 3,792,492 | 2/1974 | Neace | 360/103 |
| 3,961,369 | 6/1976 | Baumann et al. | 360/84 |
| 3,981,024 | 9/1976 | Mo et al. | 360/130.24 |
| 4,244,009 | 1/1981 | Satoh | 360/71 |
| 4,428,011 | 1/1984 | Gilovich et al. | 360/102 |

FOREIGN PATENT DOCUMENTS 56-94539 7/1981 Japan .
60-98556 6/1985 Japan .

Primary Examiner—Robert S. Tupper
Attorney, Agent, or Firm—Harry G. Thibault; Richard P. Lange

[57] ABSTRACT

A head assembly which provides in the rotary scanner body a tape support structure including a scanner opening, a pair of magnetic heads mounted in the scanner opening for the reading and writing of data on a magnetic tape medium, a support member disposed on the scanner body at the scanner opening and extending between the two magnetic heads to support the tape as it moves across the scanner opening, said tape support structure producing a dramatic improvement in signal output across the length of the head scan.

8 Claims, 4 Drawing Sheets

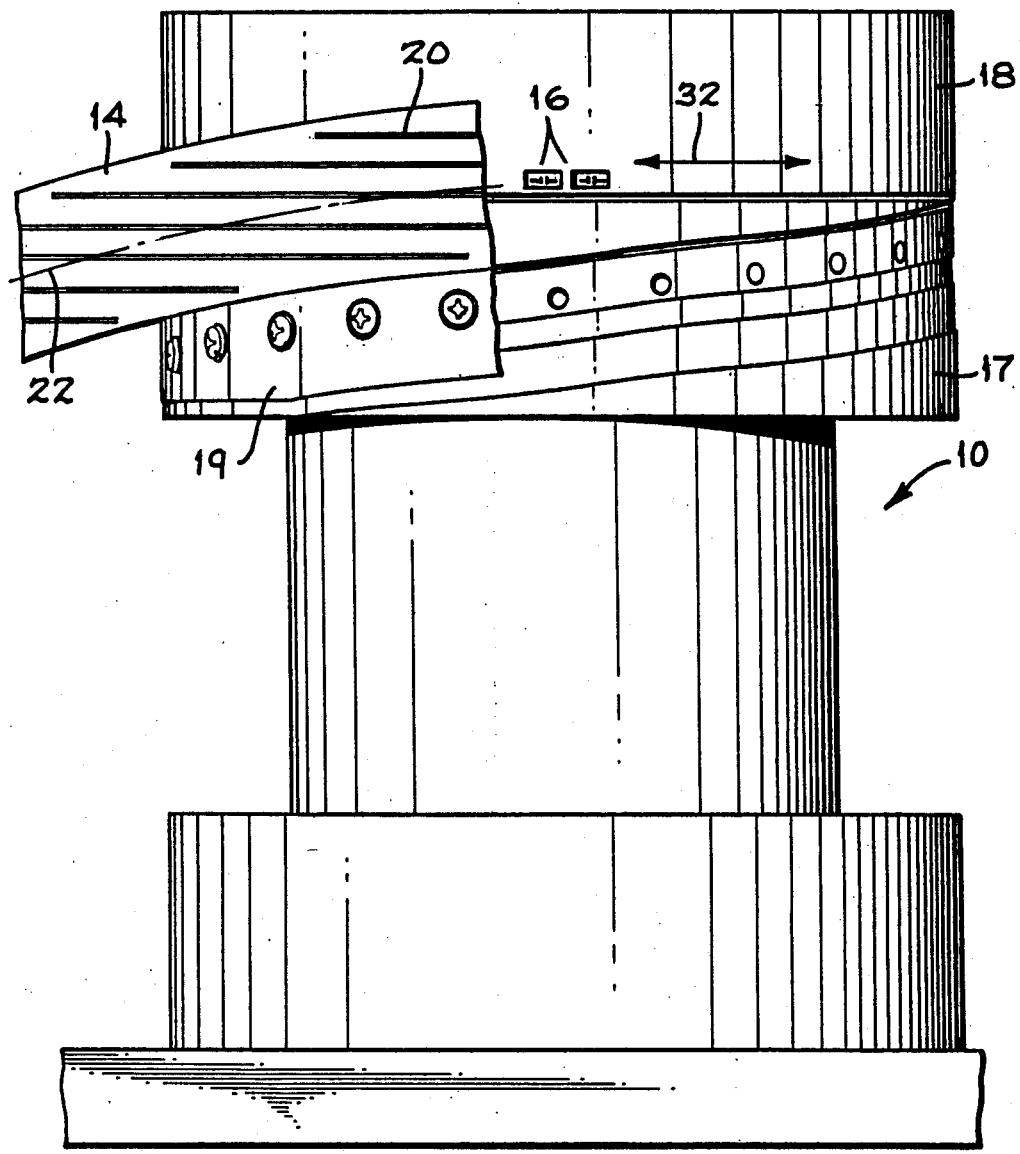
FIG_1

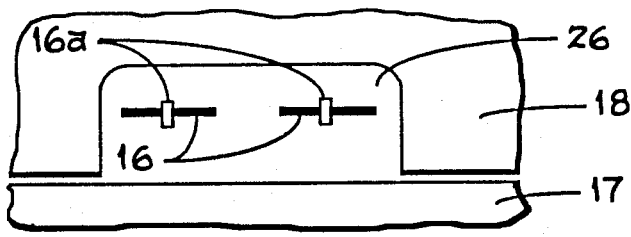
FIG_2A (PRIOR ART)
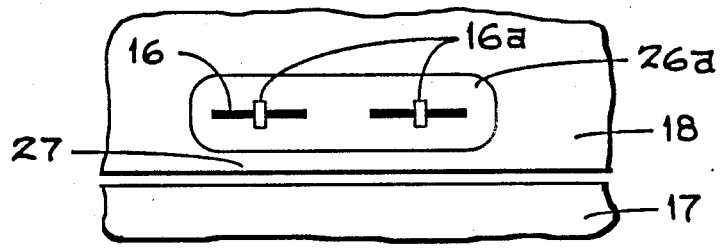
FIG_2B (PRIOR ART)
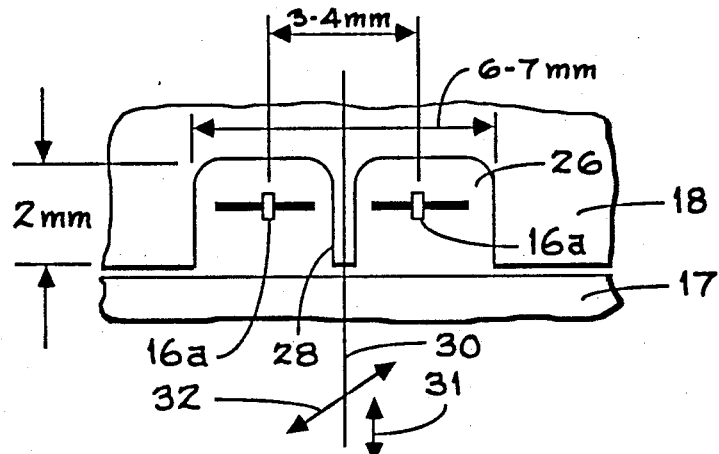
FIG_3A
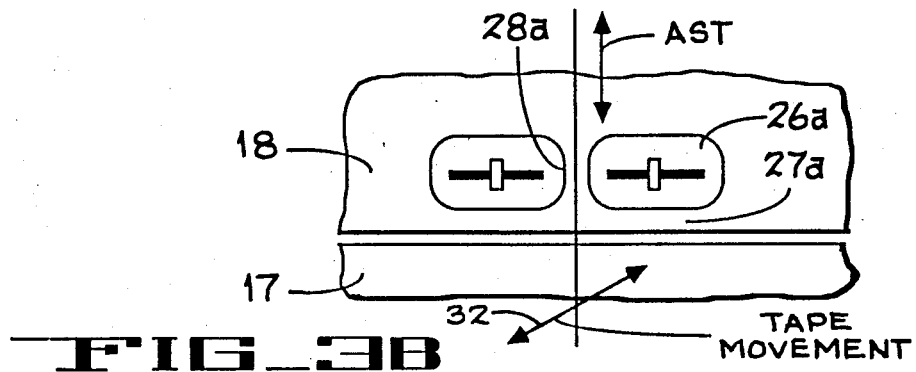
FIG_3B

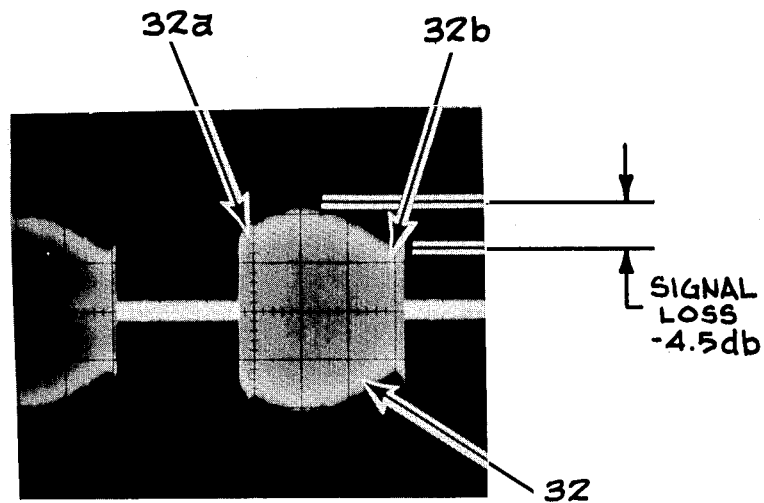
FIG_4A (PRIOR ART)
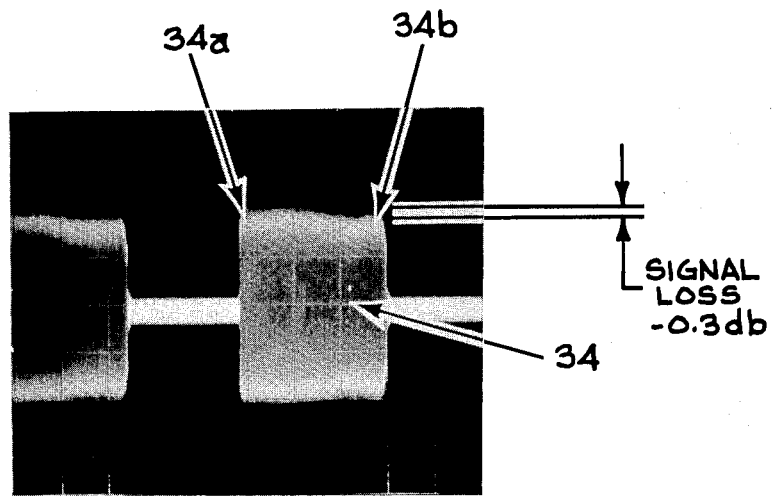
FIG_4B

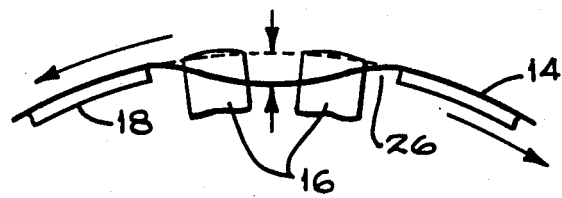
FIG_5 (PRIOR ART)
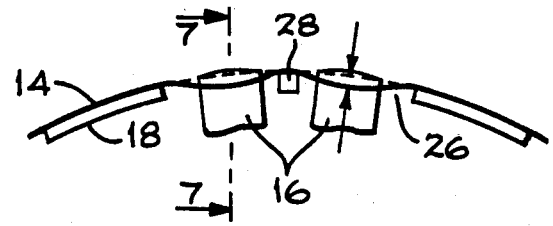
FIG_6
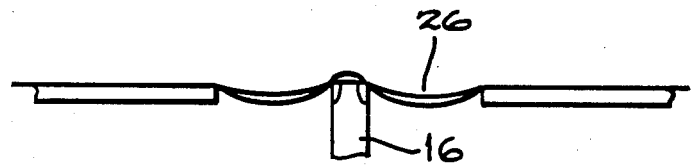
FIG_7
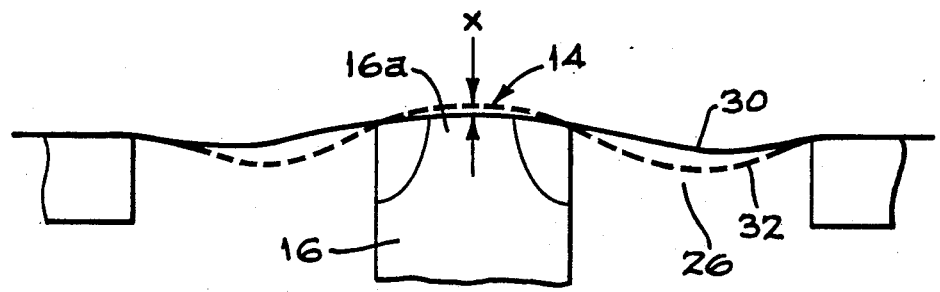
FIG_8

WEBBED SCANNER WINDOW

The present invention relates to a recording and reproducing apparatus for magnetic recording tape and in particular to a tape support structure associated with the scanning function of the apparatus.

BACKGROUND OF THE INVENTION

A known record/reproduce apparatus for magnetic recording tape includes a two piece, cylindrical scanner assembly. A lower stationary guide drum includes a tape guide element positioned at the entrance of the tape to an upper rotary scanner body mounted on the stationary guide drum so as to be freely rotatable. Magnetic tape is driven around the upper scanner body by the record/reproduce apparatus along a tape path defined by the tape guide and one or more entrance and/or exit guides mounted adjacent the upper scanner body. Depending on the data format and the apparatus configuration, the upper scanner body rotates either counter to or in the direction of tape movement and contains one or more read/write heads which scan the tape at a rate which is normally much higher than the rate of linear tape movement. The apparatus moves the tape medium along a helical path for scanning; in such format the data tracks are positioned obliquely to the longitudinal axis of the tape, to maximize the width of the individual data tracks per width of tape. To align the data tracks of the tape for movement across the heads in the scanning drum the tape must follow a helical path around the scanning drum.

With respect to both component and composite digital formats the read/write transducers mounted in the scanning drum are mounted in pairs to substantially reduce the cost and complexity of such mechanism. Typically the head pairs are disposed at a scanning window provided in the upper scanner body. Moreover, with respect to the recording or transmission of television signals, with substantially high multiples of tracks required for each television field, particularly in variable speed playback applications, each head pair sharing a common window experiences Automatic Scan Tracking (AST) deflections in rapid reciprocal movement (dithering) across the entire width of the scanning window to satisfy AST deflection requirements. Those AST deflections are large and necessitate a relatively wide scanner opening for the record/playback head pair. Moreover, typical scanner opening/head structure requirements which produce satisfactory head to tape contact using older and thicker magnetic tapes produce less predictable results when a thinner tape, such as normally used for digital applications, is used, particularly when a head pair is deflected to one side of the scanner opening.

Although there are known structures which place obstacles between the head and the scanner body to modify the head-to-tape interface; for example, in the Japanese publication 56-94539, "Cylindrical Body For Fitting Of Rotating Magnetic Head", there is no known structure which provides a means for supporting the tape between a pair of separated scanner heads. Moreover, the known structures fail to attach any significance to the problem of loss of signal output. Accordingly, such structures have little bearing on the structure and performance of the present invention.

SUMMARY OF THE INVENTION

Accordingly to the present invention a scanner opening or window having a pair of transducers in that window provides improved tape support and improves head to tape contact.

The present invention involves an improved tape support structure, including an opening in the scanner body disposed in a tape path defined by a scanner assembly of the apparatus, a magnetic read/write head pair for recording and reproducing received in said opening, and a support member for supporting the tape as it moves across said scanner opening in the tape path, the support member to provide improved support of the tape not only between head pairs but across the width of the scanner opening. The support structure of the present invention produces a substantial and unexpected improvement in the signal output of tape moving across the magnetic read/write heads disposed in the scanner window.

Accordingly, the present invention provides, in a record/reproduce apparatus including a lower guide drum and an upper scanner body mounted on the guide drum so as to be freely rotatable, and a guide element mounted on an outer surface of the guide drum to define a tape path for the movement of magnetic tape around the scanner body, a tape support structure including a scanner opening at one edge of the rotary scanner body, a pair of magnetic read/write heads mounted at the scanner window with respective head tips protruding therethrough. Mounted on the scanner body and disposed across the scanner window and between the two head tips is a support member which supports the tape at the scanner opening and between the two head tips as the tape moves around the tape path.

Having described the preferred embodiment of the invention and its advantages, additional advantages should be readily apparent to the reader upon consideration of the detailed description of the invention taken in conjunction with the drawings as described below.

BRIEF DESCRIPTION OF THE DRAWINGS

FIG. 1 is a perspective view of a scanner assembly incorporating the tape support structure of the present invention;

FIG. 2A is a partial elevational view of a prior art scanner window taken from a prior art scanner assembly similar to the assembly of FIG. 1;

FIG. 2B is an alternative embodiment of the prior art scanner window;

FIG. 3A is a partial view taken from the scanner assembly of FIG. 1 of the tape support structure of the present invention;

FIG. 3B is an alternate embodiment of the tape support structure of the present invention;

FIG. 4A is a graphical representation of the signal output produced by a scanner assembly using the prior art structure;

FIG. 4B is a graphical representation of the signal output produced by a scanner assembly using the present invention.

FIG. 5 is a schematic representation of an edge view of the tape path across a scanner window of the prior art;

FIG. 6 is a schematic representation of an edge view of a tape path across a scanner window and a tape support member of the present invention;

FIG. 7 is a view taken along the lines 7—7 of FIG. 6; and

FIG. 8 is an enlargement of a portion of the view shown in FIG. 7;

DETAILED DESCRIPTION OF THE INVENTION

In FIG. 1 is shown a head assembly 10 for a record/reproduce apparatus (not shown), the head assembly 10 incorporating the present invention. The head assembly 10 includes a stationary guide drum 17 and a rotary scanner body 18 mounted on the guide drum 17 for free rotary movement. Magnetic recording tape 14, used with the assembly 10 for the input/output of data, moves from a guide element 19 mounted on the outer surface of the guide drum 17 and travels in a helical path around the rotary scanner body 18 to permit read/write heads 16 contained within the scanning drum 18 of the assembly 10 to scan the tape 14, and thereby either read data from or write data on the tape 14. In the head assembly 10, the rotary scanner body 18 rotates counter to the direction of the tape movement. The rate and direction of the scanner movement can vary from the rate and direction of tape movement, depending on the apparatus and the tape format. To maximize the width of the data tracks per width of the tape 14, data tracks 20 on the tape 14 are disposed obliquely to a longitudinal axis 22 of the tape 14. Accordingly, to align the data tracks 20 on the tape 14 with the scanning heads 16 on the scanner body 18, it is necessary that the tape 14 traverse the drum 18 along a helical path. The tape guide element 19, provided on the stationary drum 17, directs the tape 14 into its helical path around the scanner body 18.

The read/write heads 16 which read from or write on the tape 14 are positioned as shown in the accompanying drawings FIGS. 2 and 3. In a prior art configuration as shown in FIG. 2A, a pair of transducing heads 16 are disposed at a common opening or window 26 in the scanner body 18. The window 26 and the heads 16 are disposed adjacent to the stationary drum 17 in FIG. 2A but the window 26 could be located at any relative position on the scanner body 18. In an alternate construction shown in FIG. 2B, the transducing heads 16 are mounted in a window 26a which includes a bottom wall 27. Although it is theoretically possible to use only a single pair of heads 16 at a single scanner window 26 to read from or read on the tape 14, most applications use more than one pair of magnetic read/write heads 16, which are mounted on the scanner body 18, equispaced at the periphery thereof. Thus, two sets of heads are spaced 180° apart, four sets of heads are spaced 90° apart, etc. The use of equispaced pairs of heads 16 reduces the speed of rotation for both the scanner body 18 and the heads 16, thus increasing and improving tolerances for head rotation speeds.

In FIG. 3A one embodiment of the present invention is seen as a support member or web 28 in the window 26 and between the transducer heads 16. A second embodiment of the present invention, shown in FIG. 3B, includes a web 28a which is inserted in the window 26a to extend between the heads 16a and engage a bottom wall 27a.

The function of the support member 28 is better understood when preceded by a brief description of the scanning process. Transducing heads 16 having a generally tapered upper body portion (not shown) terminate in head tips 16a which are also at the approximate midpoint thereof. The head tips 16a contact the tape 14 to read or write thereon. Although the head tips 16a appear to be in parallel alignment in FIG. 3A, because the tape 14 moves obliquely across the face of the scanner body 18, each of the head tips 16a read or write on different tracks 20 on the tape 14. Moreover, in a video format the head tips 16a move along a transverse axis 30 in a rapid back and forth traverse across the width of the scanner window 26 also described as an Automatic Scan Tracking (AST) movement of the head tips 16a across the tape 14 (and referred to as a dithering motion in the video art) as depicted by the arrow 31. In the first embodiment disclosed, the width of each scanner window is approximately 2 millimeters (mm). In FIG. 3A, the direction of tape movement around the scanner body 18 is approximated by the arrow 32. The length of the scanner window is typically in the range of six to seven mm. The distance between the transducing gaps of the head tips 16a is typically three to four mm. The tape 14 (FIG. 1) moves along the guide element 19 (FIG. 1) on the guide drum 17 and onto the scanning drum 18 along a helical path as shown by the directional arrows 32 in FIGS. 1 and 3A. To encourage contact between the tape 14 and the edge guiding element 19 of the stationary guide drum 17, the diameter of the scanner body 18 is slightly larger than the diameter of the guide drum 17. Although it has been found that the elimination of a bottom wall, such as the wall 27 in FIG. 2B, serves to better establish the air bearing between the tape 14 and the scanner assembly 10 to facilitate the movement of tape 14 around the scanner body 18, the use of a bottom wall 27 better insulates the tape 14 from crosstalk.

The support member 28, according to the present invention, in the scanning window 26 also produces a substantially improved and unexpected result in signal output.

That substantial improvement in signal output can be readily seen in a comparison of FIGS. 4A and 4B. Graph 4A, which represents the prior art structure of FIG. 2, shows a substantial drop-off ($-4.5$ dB) in signal output from the start 32a to the end 32b of the head scan 32, while the present invention produces a substantially clean and uniform signal output from the start 34a to the end 34b of the head scan 34 as shown in FIG. 4B.

While the addition of the support member 28 to the window 26 could be expected to better support the tape 14 as it moves across the window 26, the magnitude of the dramatic and substantial improvement in signal output ($+4.5$ dB) is an unexpected but welcome result developing from structural changes made. An examination of the structural relationship occurring at the head-to-tape interface is discussed below in conjunction with FIGS. 5-8.

FIG. 5 is a top plan view of the tape 14 moving across the scanner opening 26 in the prior art structure. Note that a substantial dip (at least 0.005 in) occurs on the opposite sides of the transducer heads 16 as the tape 14 moves across the scanner opening 26. As shown in FIG. 6, the addition of the web member 28 results in a substantial reduction ($<<0.005$ in.) of tape dip.

A complementary problem is shown in FIGS. 7 and 8 which relate to the amount of tape dip along the width of the window 26. The addition of the web 28 between the heads 16 produces a substantial decrease in the tape dip at the side of the heads 16 as shown by comparing the solid line 30 of the present invention with the dotted line 32 of the prior art construction in FIGS. 7 and 8.

The above structural analysis suggests several reasons for the improvement in signal output noted, but may not completely explain it. A more meaningful measurement might result from monitoring the distance X between the head tip 16a and the tape 14 (FIG. 8) from beginning to end of head scan. At present, we only know that a specific physical modification to a scanning window structure produces a dramatic and unexpected improvement in signal output during a typical head scan.

Having described a preferred embodiment and one another embodiment of the invention, it should be readily apparent that further embodiments and other modifications are possible. Accordingly, it is not intended that the present invention be restricted to the description set forth above; rather, that any limitations to the invention be set forth in the appended claims.

What is claimed is:

1. A head assembly for a tape transport including a guide drum, a scanner body mounted on the guide drum so as to be freely rotatable, said scanner body having an outer diameter which is generally equivalent to that of said guide drum, a guide element on an outer surface of the drum to define a tape path for moving the tape around the scanner body, an opening in the surface of the scanner body disposed in the tape path, a pair of magnetic read/write heads, each disposed in the opening, with each head having a tip end, each head so mounted in the scanner opening as to protrude the tip end thereof slightly outward of the scanner body and above the outer surface thereof, to contact and move across the tape for read/write operations as the scanner drum rotates while the tape is guided in the specified path around the scanner body, and a member attached to the scanner body and extending into the opening in the surface of the scanner body to be disposed between the two tip ends and to support the tape at the scanner opening and between the two head tips as it moves around the tape path.

2. A head assembly as claimed in claim 1 wherein the opening in the surface of the scanner body is disposed adjacent of the interface between the scanner body and the fixed guide drum.

3. A head assembly as claimed in claim 2 wherein the opening in the surface of the scanner body includes a bottom wall adjacent the interface between the scanner body and the fixed guide drum.

4. A head assembly as claimed in claim 2 wherein the magnetic heads are mounted in the scanner opening so that the distance between the transducing gaps of each respective head tip is in the range of two to five millimeters.

5. A head assembly as claimed in claim 2 wherein the scanning window is dimensioned to accommodate the movement of the pair of heads mounted therein in a mode associated with Automatic Scan Tracking.

6. A head assembly as claimed in claim 5 wherein the length of the scanner opening is in the range of six to seven millimeters.

7. A head assembly as claimed in claim 6 wherein the width of the scanner opening is in the range of two millimeters.

8. A scanner opening as claimed in claim 2 wherein the scanner opening is located on the surface of the scanner body at the interface between the scanner body and the guide drum to thereby eliminate a bottom wall defining a portion of the scanner opening at the scanner body to guide drum interface.

* * * * *